Patented Aug. 19, 1947

2,425,891

UNITED STATES PATENT OFFICE 2,425,891

REFRACTORIES AND METHOD OF MAKING

John Charles McMullen, Niagara Falls, N. Y., assignor to The Carborundum Company, Niagara Falls, N. Y., a corporation of Delaware No Drawing. Application January 12, 1946, Serial No. 640,983

12 Claims. (Cl. 106—63)

This invention relates to refractory articles and to methods and compositions for their manufacture. More particularly, it relates to porous refractory products such as insulating blocks and other shapes, linings and the like formed by reacting finely divided silica powder with finely powdered calcium sulphate hemi-hydrate and a small amount of a powdered flux to form a reaction product of refractory character and high strength, in which the insulating qualities are further promoted by the incorporation of combustible pore-forming materials in the composition from which the articles are formed. The invention provides a product in which the qualities of high refractoriness and resistance to change at high temperatures are combined with improved insulating properties.

This application is a continuation-in-part of application Serial No. 417,652, filed November 3, 1941.

It has long been customary procedure to form articles of refractory oxides by mixing the various materials, in granular form, followed by wetting the mixes to the proper consistency for the forming or molding step. The most common manner of molding has been a damp tamping or pressing process wherein the mix is dampened to tamping or pressing consistency, followed by tamping or pressing the article to shape and drying out the water, a small amount of temporary binder or the presence of a small amount of plastic clay in the mix being relied upon for green or unfired strength. A less widely used method of formation is a fusion process in which the raw materials are fused to the molten state, then cast into molds and allowed to cool slowly. Another method is the puddling process in which a large amount of water is mixed with the refractory material to form a slip or slurry which then is cast into a water-absorbing mold. The mold extracts the water from the mixture to solidify the material to the desired shape.

Various ingredients in small amounts have been added in carrying out these processes in order to facilitate mold removal or for other purposes, but the prime ingredients have been limited to refractory oxides in the apparent belief that it was essential to keep other materials out of the compositions to retain any satisfactory degree of refractoriness. Therefore in making oxide refractories for use at more elevated temperatures the art has been substantially along the lines of the procedures given above. The preparation of less refractory clay products for use under less severe temperature conditions has been given more latitude in manufacture but such products are decidedly less refractory and are not to be confused with the super refractory insulating articles with which the present invention is concerned.

I have discovered that insulating refractories consisting predominantly of silica which are capable of continued use at temperatures as high as 1650° C., and which have satisfactorily high strength, water-resistance and excellent insulating qualities can be made by reacting suitable mixtures of finely divided silica with calcium sulphate hemi-hydrate in the presence of a small amount of the proper fluxing material, and in which combustible pore-forming material is included in the mixture from which the articles are made to impart a porosity thereto and provide the resultant articles with an apparent density below 0.80. In the absence of a suitable flux the resulting products subsequent to firing are soft and of inadequate strength.

I have found that alumino-silicates are highly satisfactory as fluxes for purposes of the present invention. Among those which I have found to be useful therefor are the alkali feldspars including potassium feldspar ($K_2O.Al_2O_3.6SiO_2$), sodium feldspar ($Na_2O.Al_2O_3.6SiO_2$), and lithium feldspar ($3Li_2O.2K_2O.3Al_2O_3.12SiO_2.4F_2$). The aluminosilicate, beryl ($3BeO.Al_2O_3.6SiO_2$), has also been used with satisfactory results.

In accordance with the present invention highly refractory insulating articles having an apparent density below 0.80, and in the neighborhood of 0.6 to 0.7, and composed predominantly of silica are made from a mixture of finely divided silica having a mesh size of 400 and finer, finely pulverized calcium sulphate hemi-hydrate, a combustible pore-forming material and 1–5% of a suitable powdered flux. A mixture composed of finely divided silica powder having a mesh size of 400 and finer, pulverized calcium sulphate hemi-hydrate, a combustible pore-forming material, and 1–5% of a finely divided flux together with sufficient water to render the mix fluid and pourable is placed in a suitable mold whereupon the calcium sulphate hemi-hydrate, which is a hydraulic-setting material, sets up to produce a solidified article of the desired shape. According to the present process, adequate green strength of the article is obtained by the setting up or solidifying action of the calcium sulphate component. The inclusion of combustible pore-forming material in the mixture increases the porosity of the resulting article, with corresponding lowering of the apparent density, which is desired in refractory insulating products such as insulating bricks, blocks and other shapes, furnace insulation linings, refractory filter mediums, and similar articles. The solidified shape is removed from the mold, dried and fired at a temperature sufficient to burn out the combustible pore-formers included in the mix and to drive off the water of hydration plus the volatile portion of the calcium sulphate compound and to bring about the reaction or combining of the remaining ingredients to form a highly refractory product of the required density and composed principally of silica, which product is considered to be the reaction product of the original silica, the calcium sulphate hemi-hydrate, and the flux.

It has been found that the present process is especially satisfactory and adaptable to the fabrication of insulating refractory shapes and linings in which the final product possesses water-resistance, high refractoriness and adequate strength as well as unusually good insulating qualities. It has also been found that the resulting product shows little or no shrinkage or growth when repeatedly reheated to temperatures as high as 1650° C., in spite of the fact that the articles, when fabricated, need be fired only to approximately 1400° C. It is essential in carrying out the invention that the silica, the hydraulic-setting compound and the flux all be in finely divided form in the neighborhood of 400 mesh and finer in order that they may be intimately mixed with one another and therefore be brought to a complete interaction and provide a satisfactory refractory insulating body of a high ultimate strength and durability, and adequate porosity.

The invention will be described in detail as it pertains to the manufacture of highly refractory insulating products formed by the interaction of finely divided silica and calcium sulphate hemi-hydrate of the formula $CaSO_4.\frac{1}{2}H_2O$ in the presence of a small amount of a suitable flux. For purposes of illustration and in order that the invention may be more clearly understood, the following examples, which are in accordance with the teachings of the present invention, are set forth:

*Example I*

|  | Parts by weight |
|---|---|
| 400 mesh size and finer powdered flint (silica) | 74.5 |
| Powdered plaster of Paris (calcium sulphate hemi-hydrate) ($CaSO_4.\frac{1}{2}H_2O$) | 22.5 |
| Potassium feldspar powder | 3 |
| 6 and finer soft wood sawdust | 15 |
| Water | 55–70 |

The above ingredients are mixed in a "Jaeger" cement mixer, being placed in the mixer in the following order: water, sawdust, flint, and feldspar. After mixing to a uniform consistency, the plaster of Paris is added rapidly with continued mixing. Mixing is continued for only 2–3 minutes after the plaster of Paris has been added after which the mix is ready for pouring into the mold.

Up to the stage where the flint is added, the mix, that is the sawdust and water, is a very dry-looking material. The exact amount of water used depends upon the moisture contained in the sawdust employed and the consequent moisture-absorptive powers of the sawdust. Upon addition of the flint and feldspar the mix becomes quite liquid. The plaster of Paris (calcium sulphate hemi-hydrate) is added last and the mixing continued for an additional 3 minutes. When the mixing is carried out in the above type of mixer no lumps are formed as are obtained when a finger type mixer is employed. Immediately after the mix has been poured into the molds the mixer is flushed out with water as any old water left in the mixer is liable to cause the next mix to set or harden prematurely. Such an acceleration of setting is undesirable as there is just sufficient time available to empty the mix into the molds prior to the initial setting. A retarder may be added if additional working is required for handling and molding. A fraction of a percent of glue acts as a satisfactory retarding agent without affecting the finished product. The mixture is poured into open top molds and allowed to stand until it solidifies which usually takes place in 15–30 minutes. The top surface is then leveled off and smoothed and the solidified bodies removed from the molds. Suitable molds can be made from any smooth surface material; well shellaced hard wood or greased galvanized iron molds have been used satisfactorily. Upon removal from the molds the molded articles are placed in a dryer and dried at a temperature of 150° C. to drive off mechanically held moisture after which they are fired by raising to a temperature of about 1400° C. at the rate of 100° C. per hour, and held at that temperature for a time sufficient to bring the fired article to that temperature uniformly throughout. For standard 9 inch bricks holding at 1400° C. for two hours is sufficient.

*Example II*

|  | Parts by weight |
|---|---|
| 400 mesh size and finer powdered flint (silica) | 74 |
| Powdered plaster of Paris (calcium sulphate hemi-hydrate) ($CaSO_4.\frac{1}{2}H_2O$) | 21 |
| Beryl ($3BeO.Al_2O_3.6SiO_2$) powder | 5 |
| 6 and finer soft wood sawdust | 15 |
| Water | 50–70 |

The above ingredients are mixed and processed in accordance with the procedure set forth in Example I above.

The resulting refractory bodies can be used for insulating furnace walls and for other purposes at operating temperatures as high as 1650° C. over prolonged periods of time. It is composed of the reaction product of the powdered silica, the calcium sulphate hemi-hydrate and the flux and has a very high softening range in excess of 1650° C. The combustible pore-forming material is burned out in the firing step to provide a uniform, highy porous structure. Porosity of the article is provided not only by the burning out of the heat combustible material but also by driving off of the water of hydration and volatile portions of the hydraulic-setting ingredient. The bulk or apparent density of articles fired at temperatures of about 1400° C. is below 0.80, and is generally in the neighborhood of .60 to .70.

It is essential in carrying out the present invention to incorporate from 1–5% of a suitable flux in the original mixture from which the articles are made in order to impart adequate strength to the fired articles. Satisfactory results are obtained when the percentage of flux is maintained between 1 and 5% by weight of the dry mixture. When less flux is used the flux does not have sufficient hardening effect whereas over 5% of flux destroys the product's refractoriness and ability to resist change at high temperatures. The effect of the use of the proper amount of a suitable flux is clearly demonstrated by the following table setting forth results of using 1–5% of a potassium feldspar flux in the mix, as compared to results obtained when no flux is used, and results when excessive amounts of flux are employed. It can be seen that less than 1% of flux is ineffective to accomplish the desired result, and that more than 5% of flux is detrimental to ability of the product to resist change at high temperatures.

| Amt. of Flux | Condition of Fired Article | Effect of Reheating to 1600° C. |
|---|---|---|
| 0% | Very soft—too soft for use | |
| 1% | Slightly soft, but usable | No change. |
| 3% | Satisfactory strength and hardness. | Do. |
| 5% | ----do---- | Shrinks .12%. |
| 7½% | ----do---- | Shrinks 3.30%. |
| 10% | ----do---- | Shrinks 14.22%. |

Refractory articles embodying the present invention are characterized by a combination of properties which extend the range of use of such bodies to include new fields and higher temperatures and from which numerous advantages accrue, and which have heretofore been lacking in insulating mediums of the prior art. As already pointed out such bodies exhibit together an unusually high refractoriness and resistance to detrimental change at high temperatures and also very good insulating properties. In this respect the refractory insulating bodies of the present invention possess the essential property of being able to withstand repeated reheatings to temperatures around 1600° C. without appreciable growth or shrinkage of the body. This unusually high refractoriness is coupled with excellent insulating properties by reason of the high porosity, or expressed otherwise, the low apparent density of under 0.8, of the resulting bodies. The low thermal conductivity of the material when installed in furnace walls in the form of blocks or as a monolithic lining produces a very stable temperature gradient which in turn greatly reduces the heat loss through the furnace wall and raises the efficiency of operation of the furnace. In addition to the above, the present bodies not only have a high green strength by reason of the hydraulic-setting action of the calcium sulphate hemi-hydrate but by reason of the presence of the small percentage of flux, when fired are mechanically strong and can be handled for shipping and installation in furnace walls and the like without breakage or crumbling of the corners or edges. Moreover, articles as herein made can be formed to size although they are easily trimmed and cut to exact shapes as desired. They can be easily rubbed down to size for close fitting installations in spite of their relatively high mechanical strength. Shapes which can be made to size include not only bricks and blocks, but crucibles, tubes and other objects suitable for varied refractory usage. Also compositions of the herein described type can be poured and fired in place to form the monolithic lining of a furnace structure. Inertness toward other refractory materials makes the use of the present articles or linings in conjunction with other refractories satisfactory and advantageous. They can be subjected to repeated reheatings to elevated temperatures without appreciable shrinkage and still retain their original high strength and insulating qualities. These and other advantages are readily apparent with use of the present articles.

In carrying out the present invention it is not desired to be confined or limited to the compositions or proportions which have been set forth herein by way of example. The calcium sulphate hemi-hydrate can be varied within the range of 10–35% by weight of the original dry mixture with satisfactory results. It is also to be understood that the combustible pore-forming materials can also be varied in amount, although for best results such materials will not amount to more than 30% or less than 10% by weight of the entire composition. Other pore-forming materials capable of use herein include pulverized nut shells, ground coke, hard or soft wood flour, and other organic or inorganic heat combustible materials in granular or ground form.

The total amount of water used ranges from 55% to 70% by weight of the dry ingredients exclusive of the combustible pore-forming ingredient. When sawdust is used as the pore-forming constituent the exact amount of water needed to obtain a flowable mixture of proper fluidity varies and will depend upon the sawdust used. The exact amount of water to be used can be determined as follows. A weighed specimen of 6 to 40 mesh size of the sawdust to be used is soaked for 30 minutes in cold water, drained 15 minutes on a 50 mesh screen, weighed, and the percentage of absorbed water calculated. The remaining dry ingredients of the complete casting mix to be made up can be considered to require about 20% by weight of water; the sawdust requirement, as found above, is added to the 20% figure to obtain the total percent of water to use.

Having fully described the invention it is desired to claim:

1. A fired refractory insulating article consisting essentially of silica of 400 mesh size and finer, the non-volatile constituents of 10 to 35% by weight of calcium sulphate hemihydrate and 1 to 5% of an alumino-silicate flux.

2. A fired refractory insulating article consisting essentially of silica of 400 mesh size and finer, the non-volatile constituents of 10 to 35% by weight of calcium sulphate hemi-hydrate and approximately 3% of an alumino-silicate flux.

3. A fired refractory insulating article consisting essentially of silica of 400 mesh size and finer, the non-volatile constituents of 10 to 35% by weight of calcium sulphate hemi-hydrate and 1 to 5% of an alkaline alumino-silicate flux.

4. A fired refractory insulating article consisting essentially of silica of 400 mesh size and finer, the non-volatile constituents of 10 to 35% by weight of calcium sulphate hemi-hydrate and 1 to 5% of an alkali feldspar.

5. A fired refractory insulating article consisting essentially of silica of 400 mesh size and finer, the non-volatile constituents of 10 to 35% by weight of calcium sulphate hemi-hydrate and 1 to 5% of beryl.

6. A fired refractory insulating article consisting essentially of silica of 400 mesh size and finer, the non-volatile constituents of 10 to 35% by weight of calcium sulphate hemi-hydrate and 1 to 5% of an alumino-silicate flux, and of sufficient porosity to have a density less than 0.80.

7. As a new article of manufacture, a water-resistant refractory insulating body consisting of the following ingredients in bonded form: approximately 75% silica of 400 and finer mesh size, the non-volatilized constituents of 22% by weight calcium sulphate hemi-hydrate and approximately 3% of an alumino-silicate flux.

8. A composition of matter for the manufacture of refractory articles consisting of finely divided silica having a mesh size of approximately 400 and finer, a combustible pore-forming material, from 10 to 35% by weight of calcium sulphate hemi-hydrate and 1 to 5% of a flux.

9. A composition of matter for the manufacture of refractory articles consisting of finely divided silica having a mesh size of approximately 400 and finer, a combustible pore-forming material, from 10 to 35% by weight of calcium sulphate hemi-hydrate and approximately 3% of a flux.

10. A composition of matter for the manufacture of refractory articles consisting of finely divided silica having a mesh size of approximately 400 and finer, a combustible pore-forming material, from 10 to 35% by weight of calcium sulphate hemi-hydrate and 1 to 5% of an aluminosilicate flux.

11. A composition of matter for the manufacture of refractory articles consisting of finely divided silica having a mesh size of approximately 400 and finer, a combustible pore-forming material, from 10 to 35% by weight of calcium sulphate hemi-hydrate and 1 to 5% of an alkaline feldspar.

12. A composition of matter for the manufacture of refractory articles consisting of finely divided silica having a mesh size of approximately 400 and finer, a combustible pore-forming material, from 10 to 35% by weight of calcium sulphate hemi-hydrate and 1 to 5% of beryl as a flux.

JOHN CHARLES McMULLEN.

REFERENCES CITED

The following references are of record in the file of this patent:

UNITED STATES PATENTS

| Number | Name | Date |
| --- | --- | --- |
| 2,242,434 | Norton | May 20, 1941 |
| 1,544,433 | Coss | June 30, 1925 |